United States Patent [19]

Hamamiya et al.

[11] Patent Number: 5,046,398

[45] Date of Patent: Sep. 10, 1991

[54] NEGATIVE PRESSURE BOOSTER WITH A GROOVE FORMED BY A DIE

[75] Inventors: Fumihiro Hamamiya; Hidefumi Inoue, both of Higashimatsuyama, Japan

[73] Assignee: Jidosha Kiki Co., Ltd., Tokyo, Japan

[21] Appl. No.: 453,873

[22] Filed: Dec. 20, 1989

[30] Foreign Application Priority Data

Dec. 26, 1988 [JP]   Japan .......................... 63-167856[U]

[51] Int. Cl.$^5$ .............................................. F15B 9/10
[52] U.S. Cl. .................................................. 91/369.2
[58] Field of Search ................ 91/369.1, 369.2; 92/48, 92/49, 98 R, 98 D, 99; 29/890.126, 890.127, 890.13, 890.132; 137/627.5

[56] References Cited

U.S. PATENT DOCUMENTS

| | | | |
|---|---|---|---|
| 4,085,656 | 4/1978 | Ando | 137/627.5 X |
| 4,719,842 | 1/1988 | Gautier | 91/369.2 |
| 4,729,286 | 3/1988 | Blot | 91/376 R X |
| 4,777,865 | 10/1988 | Gautier | 91/376 R X |
| 4,892,027 | 1/1990 | Wagner et al. | 91/376.1 |

FOREIGN PATENT DOCUMENTS 2523910   9/1983   France .............................. 91/376 R Primary Examiner—Edward K. Look
Assistant Examiner—John Ryznic
Attorney, Agent, or Firm—Varndell Legal Group

[57]   ABSTRACT

In the negative pressure booster equipment of this invention, the vacuum passage to provide the communication between the control valve and the constant pressure chamber is furnished with a groove formed by the forming die of the valve body.

According to the present invention, therefore, the groove is formed as the vacuum passage when the valve body is formed by a forming die of the valve body. By this groove, the sectional area of the vacuum passage is enlarged, and the air in the variable pressure chamber flows in larger quantity toward the constant pressure chamber. This causes the rapid restoration of vacuum pressure in the variable pressure chamber, and the power piston is promptly returned to the non-operating position. Because the groove is formed by a forming die, the portion with the groove is not enlarged.

1 Claim, 2 Drawing Sheets

NEGATIVE PRESSURE BOOSTER WITH A GROOVE FORMED BY A DIE

BACKGROUND OF THE INVENTION

The present invention relates to a negative pressure booster equipment to be used for brake booster equipment.

In the brake booster equipment using negative pressure, a tandem type brake booster equipment having two power pistons in tandem has been used conventionally as described, for example, in the Japanese Provisional Utility Model Publication Sho 63-53860 in order to obtain high braking power by lower brake pedal depressing force.

In such tandem type brake booster equipment, the control valve is switched over and the atmospheric air is introduced into two variable pressure chambers divided by two power pistons when brake pedal is depressed for braking operation, and by the action of the air thus introduced, two power pistons are operated. By the action of these power pistons, the master cylinder is operated, and brake fluid pressure is generated, resulting in the braking operation. Because the piston of master cylinder is operated by two power pistons in this case, the maximum braking fluid pressure is increased more than that of the brake booster equipment having a single power piston.

In the valve body to accommodate the control valve of such conventional type brake booster equipment, the cylindrical portion with rear shell cannot have very large diameter, whereas the control valve is installed just in the cylindrical portion. On the other hand, the valve body is provided with a vacuum passage communicating the control valve with the constant pressure chamber, and it was impossible in the conventional type equipment to enlarge the sectional area of the end portion of the vacuum passage on the control valve side because of the shape of the valve body.

For this reason, in case the air in the variable pressure chamber flows out toward the constant pressure chamber through the control valve and the vacuum passage when the operation of booster equipment is cancelled, the air is throttled at the end of the vacuum passage on the control valve side. When the air is throttled in this way, the return of the power piston of the booster equipment is delayed, and the release of the brake is delayed. In the tandem type booster equipment as described above, a large quantity of the air in two variable pressure chambers must pass through the portion with smaller sectional area, and the return of the power piston is extremely delayed.

Thus, there is the need to enlarge the sectional area of the end of vacuum passage on the control valve side. However, mere enlargement of the sectional area causes another problem, i.e. the increase in the size of the booster equipment.

SUMMARY OF THE INVENTION

The object of this invention is to rapidly release the operation without increasing the size of the booster equipment.

In order to attain this object, the negative pressure booster equipment of this invention is characterized in that the vacuum passage communicating the control valve with the constant pressure chamber is provided with a groove formed by a forming die of the valve body.

In the negative pressure booster equipment by this invention, the groove is formed on the vacuum passage when the valve body is molded by the forming die. Because the sectional area of the vacuum passage is enlarged by this groove, the air of the variable pressure chambers flows in much more quantity toward the constant pressure chamber when the operation is cancelled. This speeds up the return of vacuum pressure in the variable pressure chambers, and the power piston is rapidly returned to the non-operating position.

Because the groove is formed by a forming die, this portion is not enlarged.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
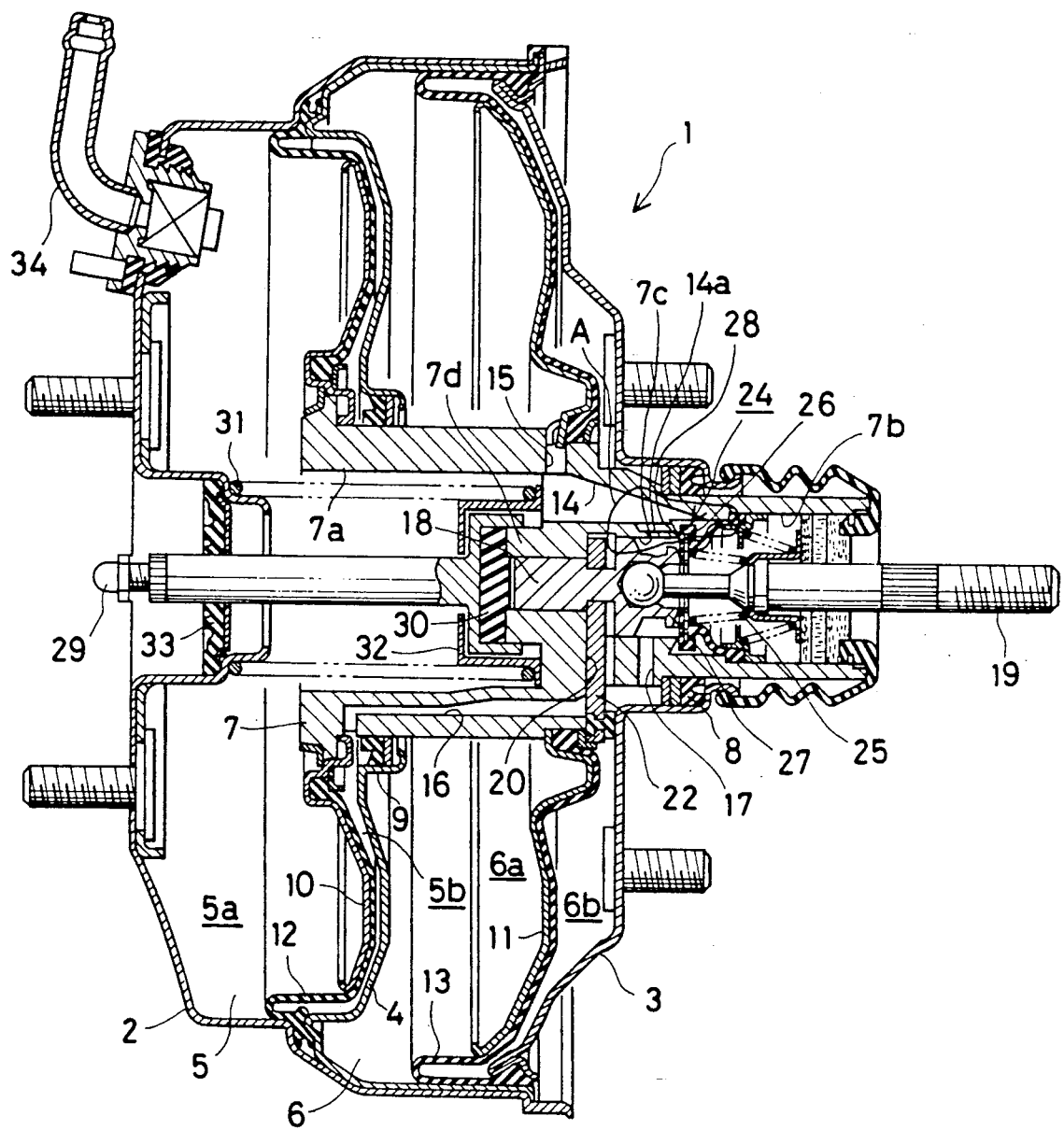
FIG. 1 is a longitudinal sectional view of an embodiment, in which the negative pressure booster equipment of this invention is applied to a tandem type brake booster.

In the following, the embodiment of this invention is described in connection with the drawings:

As shown in FIG. 1, the brake booster equipment 1 is furnished with a front shell 2 and a rear shell 3, and the front shell 2 and the rear shell 3 are joined together, for example, by bayonet joint, to form a large space inside. The space within the shells 2 and 3 is divided into a front chamber 5 and a rear chamber 6 by a center plate 4.

A valve body 7 is installed to pass through the rear shell 3 and the center plate 4, and this valve body 7 is supported airtightly and slidably on the rear shell 3 and the center plate 4 by a pair of sealing members 8 and 9. To the valve body 7, a front power piston member 10 and a rear power piston member 11 accommodated in the front chamber 5 and the rear chamber 6 respectively are connected. On the backside of these power piston members 10 and 11, a front diaphragm 12 and a rear diaphragm 13 are mounted between the shells 2 and 3 and the valve body 7. The power pistons are composed of these power piston members 10 and 11 and the diaphragms 12 and 13, and the front chamber 5 is divided into a first constant pressure chamber 5a and a first variable pressure chamber 5b, and the rear chamber 6 is divided into a second constant pressure chamber 6a and a second variable pressure chamber 6b by these power pistons.

The valve body 7 is provided with a bore 7a opening to the first constant pressure chamber 5a, a bore 7b opening to the atmospheric air, and a bore 7c communicating with the second variable pressure chamber 6b. The valve body 7 is also furnished with an axial passage 14, forming the vacuum passage of this invention, communicating both bores 7a and 7c, and further with a radial passage 15 communicating the passage 14 with the second constant pressure chamber 6a. Further, the valve body 7 is furnished with an axial passage 16 communicating the second variable pressure chamber 6b and the first variable pressure chamber 5b and with a passage 17 communicating the second variable pressure chamber 6b and the bore 7c.

Figure 2:
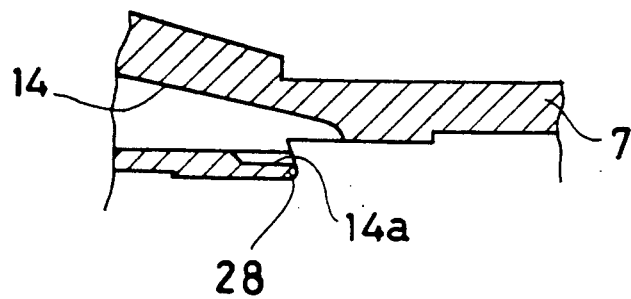
FIG. 2 is an enlarged detail drawing of the portion A in FIG. 1.

As shown in FIG. 2 in detail, a groove 14a is provided at the rear end of the passage 14. The sectional area of the rear end of the passage 14 is enlarged by this groove 14a.

In the bore 7c of the valve body 7, a valve plunger 18 is slidably engaged. On the right end of this valve plunger 18, an input shaft 19 coupled with the brake pedal (not shown) is connected. The valve body 7 is furnished with a radial bore 20 communicating with the bore 7c, and a key member 22 passes through the bore 20 and extends into the bore 7c. This key member 22 prevents the valve plunger 18 from coming out of the valve body 7. This key member 22 is relatively movable to the axial direction for a certain distance in relation to the valve body 7.

A control valve 24 is provided between the bores 7b and 7c of the valve body 7. This control valve 24 is mounted on the valve body 7 and comprises a valve disc 26 pushed toward the valve plunger 18 by resilient force of a spring 25 installed between this and input shaft 21, a first valve seat 27 formed at the right end of the valve plunger 18, and a second valve seat 28 formed on the valve body 7. When the valve disc 26 is seated on the first valve seat 27 and is separated from the second valve seat 28, this control valve 24 provides the communication of the first and the second constant pressure chambers 5a and 6a with the first and the second variable pressure chambers 5b and 6b and shuts off the communication between the first and the second variable pressure chambers 5b and 6b and the atmospheric air. When the valve disc 26 is separated from the first valve seat 27 and is seated on the second valve seat 28, the control valve shuts off the communication of the first and the second constant pressure chambers 5a and 6a with the first and the second variable pressure chamber 5b and 6b and provides the communication between the first and the second variable pressure chambers 5b and 6b and the atmospheric air.

An output shaft 29 is mounted on the bore 7a of the valve body 7, and the projection 7d of the valve body 7 is engaged in a hole formed on the right end portion with larger diameter of this output shaft 29. In the hole of this right end portion with larger diameter, a reaction disc 30 is accommodated between the valve body 7 and the output shaft 29. Accordingly, the left end of the valve plunger 18 is placed face-to-face to this reaction disc 30 with a certain gap therebetween. A retainer 32 pushed rightward by a return spring 31 to return the valve body to the non-operating position prevents the output shaft 29 from coming out of the valve body 7. The left end portion of the output shaft 29 is supported airtightly and slidably by a sealing member 33 and protrudes outwardly from the front shell 2, and the left end is coupled with the piston of the master cylinder (not shown) mounted on the front shell 2.

The valve body 7, the front power piston 10 and the rear power piston 11 connected with it are maintained at the non-operating position as shown in the drawing by the return spring 31. In this non-operating condition, the key member 22 limits the rightward movement of the valve body 7 and the valve plunger 18 by coming into contact with the inner surface of the rear shell 3, keeping these components at the backward limit position. In this case, the key member 22 is at the most advanced position in relation to the valve body 7. Under this condition, the valve disc 26 is seated on both the first valve seat 27 and the second valve seat 28. Therefore, when the valve plunger 18 is operated through the input shaft 19 during braking operation, the valve disc 26 is separated from the first valve seat 27, and the first and the second variable pressure chambers 5b and 6b are communicated with the atmospheric air.

The first constant pressure chamber 5a is communicated with the intake manifold of an engine (not shown) through a negative pressure inlet pipe 34 mounted on the front shell 2. Accordingly, negative pressure is always introduced in the first and the second constant pressure chambers 5a and 6a.

Next, description will be given on the operation of this embodiment.

When the brake booster equipment 1 is at the non-operating position as shown in the drawing, the pressure in the first and the second variable pressure chambers 5b and 6b is a little higher than that of the first and the second constant pressure chambers 5a and 6a, and it is approximately balanced with the latter added with the resilient force of the return spring 31.

When the brake pedal is depressed for braking operation, the input shaft 19 and the valve plunger 18 advance toward the valve body 7, and the first valve seat 27 is immediately separated from the valve disc 26. Thus, the air with the atmospheric pressure enters the second variable pressure chamber 6b through the gap between the valve disc 26 and the first valve seat 27 and through the bore 7c and the passage 17. The air flowing into the second variable pressure chamber 6b also enters the first variable pressure chamber 5b through the passage 16 at the same time.

As the result, both power pistons are operated. The brake booster equipment sends the output through the output shaft 29 and operates the piston of the master cylinder. However, the braking effect is not yet provided because of the resistances on the braking circuit at the master cylinder and thereafter. In this early stage of operation, the reaction disc 30 and the valve plunger 18 do not engage with each other because there is a gap between them.

When the above resistances are overcome, the braking is started. Because the gap between the reaction disc 30 and the valve plunger 18 is absorbed, these are engaged with each other. Then, the reaction force due to the braking action is transmitted to the driver through the output shaft 29, the reaction disc 30, the valve plunger 18 and the input shaft 19. At this moment, the output is already relatively higher than the input, and the so-called jumping operation occurs.

When the brake pedal is released to cancel the braking operation, the input shaft 19 and the valve plunger 18 move rightward in relation to the valve body 7. As the result, the first valve seat 27 comes into contact with the valve disc 26 and shuts off the communication of the first and the second variable pressure chambers 5b and 6b with the atmospheric air. At the same time, the valve disc 26 is separated from the second valve seat 28 and provides the communication between the first and the second variable pressure chambers 5b and 6b and the first and the second constant pressure chambers 5a and 6a. As the result, the air in the first and the second variable pressure chambers 5b and 6b passes through the gap between the valve disc 26 and the second valve seat 28 and the passage 14 and flows toward the first constant pressure chamber 5a and further toward the intake manifold through the negative pressure inlet pipe 34.

In this case, the key member 22 and the valve plunger 18 are at the most backward position in relation to the valve body 7, and the gap between the valve disc 26 and the second valve seat 28 is relatively big. Moreover, by the groove 14a provided on the rear end of the passage 14, i.e. at the end portion on the control valve 24 side, the sectional area of the passage 14 at this portion is enlarged. Accordingly, the air in the first and the second variable pressure chambers 5b and 6b rapidly flows. Thus, the valve body 7 and the front and the rear power pistons are moved backward by the resilient force of the spring 31.

When the key member 22 comes into contact with the inner surface of the rear shell 3, the valve plunger 18 does not move backward further, while the valve body 7 continues to move backward until the key member 22 comes to the most advanced position in relation to the valve body 7. When the key member 20 is at the most advanced position in relation to the valve body 7, the valve body 7 does not move backward any more and remains at the backward limit position. In this way, the valve body 7 and the valve plunger 18 are at the initial non-operating position as shown in the drawing.

Figure 3:
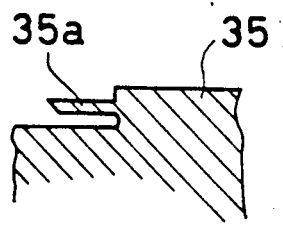
FIG. 3 is a sectional view showing a part of a forming die to mold the valve body.

To mold the valve body 7 of this embodiment, the left side forming die to form the bore 7a and the passage 14 and the forming die to form the bores 7b and 7c are used. As shown in FIG. 3, the right side forming die is provided with a nail-like projection 35a to come into contact with the tip of the left side forming die to form the passage 14. By this projection 35a, the groove 14a is formed at the rear end of the passage 14 as shown in FIG. 2 when the valve body 7 is formed. Thus, the groove 14a can be easily formed by the forming die 35.

In the embodiment as described above, the description has been given on the case where the tandem type negative pressure booster equipment is applied as a brake booster, but the present invention is not limited to this, and it can be applied, for example, to the negative pressure booster equipment of single power piston type.

Also, description has been given on the case where the negative pressure booster equipment of this invention is applied to a brake booster, while the present invention can be applied to the other types of booster equipment such as clutch booster.

As it is evident from the above description, it is possible by the negative pressure booster equipment according to this invention to rapidly discharge the air in the variable pressure chamber when the operation is cancelled because a groove to enlarge the sectional area of the passage is furnished at the rear end of the vacuum passage, i.e. at the end portion on the control valve side, where the air flows from the control valve toward the low pressure chamber. Accordingly, it is possible to rapidly return the power piston to the initial non-operating position and to promptly cancel the operation of the negative pressure booster equipment.

Because this groove is formed by the forming die of the valve body, the groove can be easily formed, and there is no need to enlarge the diameter of the portion of the valve body where the groove is formed. This eliminates the inconvenience to increase the size of the negative pressure booster equipment.

What we claim is:

1. A negative pressure booster equipment, comprising a valve body movably mounted in the space formed by a front shell and a rear shell and airtightly and slidably passing through said rear shell, a power piston connected with said valve body and divided into a constant pressure chamber where negative pressure is introduced through said space and a variable pressure chamber where the air at atmospheric pressure is introduced during operation, an input shaft movably mounted in said valve body, and a control valve mounted in said valve body and switched over to selectively provided the communication of said variable pressure chamber with the atmospheric air or with said constant pressure chamber when operated by said input shaft, characterized in that a vacuum passage communicating said control valve with said constant pressure chamber is furnished with a groove formed into a nail-like recession by a right side forming die of said valve body having a nail-like projection for contacting a tip of a left side die for forming the constant pressure passage when the valve body is molded.

* * * * *